Nov. 22, 1949     S. T. EVENSTAD ET AL     2,488,620
MACHINE TOOL OPERATING SYSTEM Filed Oct. 27, 1944     5 Sheets-Sheet 1

Inventor
Sydney T. Evenstad
William F. MacGlashan, Jr.

Nov. 22, 1949   S. T. EVENSTAD ET AL   2,488,620
MACHINE TOOL OPERATING SYSTEM
Filed Oct. 27, 1944   5 Sheets-Sheet 4

Inventor
Sydney T. Evenstad
William F. MacGlashan, Jr.
Barkelew & Leautlebury
Atty.

Nov. 22, 1949  S. T. EVENSTAD ET AL  2,488,620

MACHINE TOOL OPERATING SYSTEM

Filed Oct. 27, 1944  5 Sheets-Sheet 5

Inventor
Sydney T. Evenstad
William F. MacGlashan, Jr.
Barlelew & Leautlebury
Atty.

Patented Nov. 22, 1949

2,488,620

UNITED STATES PATENT OFFICE 2,488,620

MACHINE TOOL OPERATING SYSTEM

Sydney T. Evenstad, El Monte, and William F. MacGlashan, Jr., Alhambra, Calif., assignors to James H. Knapp Company, Los Angeles, Calif., a corporation of California Application October 27, 1944, Serial No. 560,674

4 Claims. (Cl. 77—32)

This invention has to do with systems for automatically controlling the operation, and successive series of operations, of machine tools. Typically, as hereinafter described, the mechanism and control system of the invention are applied to a machine tool having the functions of a drill press. However, the broad and general features of the invention are not necessarily limited to application to a drill press, but may be applied generally to machine tools, such as tapping, honing or lapping machines, lathes, etc., performing functions similar to those which may be performed by a drill press. And, although the invention is not necessarily limited to the form of an attachment adapted to be applied to existing tools, yet certain additional features of the invention have to do with the provision of an operating and control design which may be readily and quickly applied as a unit to existing standard drill presses. A typical embodiment of the invention will therefore be described as applied as an attachment to a standard drill press, but without limitation to such form or use excepting in those features of the invention which have to do only with that particular type of use.

Generally speaking, a primary objective of the invention is the provision of a simple and reliable system of automatic operation and control for machine tools and particularly for drill presses; and a secondary objective is the provision of a unitary device in the form of a readily applicable attachment. Numerous other objects and corresponding features and accomplishments of the invention will be best understood from the following description of the present preferred embodiment of the invention and its modes of operation and control. It may be remarked preliminarily that the control system is largely, or almost wholly electrical in its nature, thus minimizing the physical structure involved in the device. That is one of the reasons why, as compared with other previously known control systems, my control system is characteristically very simple in its physical structure and is thus particularly adapted to be designed and used as an attachment.

A short preliminary description of typical functions which the device may be set to perform will be helpful in an understanding of the invention from the subsequently following detailed description of the present preferred embodiment. Starting with the spindle and tool of the drill press at the top of its stroke (which may be either the top position physically limited by the drill press itself, or a top position selected by a setting of the control system), the device is operable to perform, among other selective functions which will appear in the detailed specification, the following typical functions:

(a) Upon initial manual starting, the tool is fed quickly from its top position down to the surface of the work, whether that surface is the upper surface of the work, or, for instance, the bottom of a previously drilled hole.

(b) Having reached the surface of the work the tool is then fed down with a pre-selected and pre-set drilling pressure, determinable to suit the size and nature of the tool and the material operated upon, either until the predetermined bottom of the hole is reached, or until the tool should be temporarily raised for clearing.

(c) In a typical case the tool, which for the purpose of this general description may be considered to be an ordinary twist drill, is fed down under the pre-selected feed pressure until it should be raised for clearing. It is then automatically and quickly raised for clearing, but only raised to a pre-selected level which may be at or close to the surface of the work. This upper clearing level can be set at any selected elevation, lower than the work surface, or above it even as high as the top of the stroke. Having been thus quickly raised for clearing, the drill is again quickly fed down to the then existing hole bottom, and then again fed down under the pre-adjusted feed pressure to drill further until it is again automatically raised for clearing. This automatic clearing operation may take place any number of times; in some operations not taking place at all, and in other operations taking place once or an indefinite number of times. In drilling a deep hole the clearing operation may take place a large number of times, continuing until the pre-set bottom of the hole is reached, either within the piece of work or through it. By a manual setting, a pre-selected depth of hole may be initially drilled before the intermittent clearing function begins to take place.

(d) When the drill finally reaches the pre-set ultimate depth, either at a bottom in the piece of work or with the hole drilled through the piece, the drill is then quickly raised to the top of the stroke.

(e) Having reached the top of the stroke the drill then, depending upon the operator's choice, either remains in its top position until the operator manually initiates the next sequence of operations, or the device may be set so that it will then automatically proceed with the next series of operations without the necessity of manual starting. During the time that the drill is travelling to the top of the stroke and then automatically coming down again to start the next series of operations, the work piece may either be changed manually or an automatic indexing device may be automatically actuated in timed cooperation with the control system to remove the finished piece and insert a new piece of work.

The foregoing merely describes typical functions and sequences. There are several other particular functions which may be performed, and several other combinations and sequences, as will appear as the following detailed description proceeds. For the purpose of a detailed description reference is had to the accompanying drawings in which.

Referring first more particularly to Figs. 1 and 2, the main shaft, or the feed shaft of the device, is shown at 10 mounted in bearings which will be described, in a gear casing which is generally indicated by the numeral 11. Casing 11 contains the driving gears and slip clutch (the torque limiting element) of the feed. Mounted on the top of casing 11 there is a casing, generally designated by the numeral 12, which contains the several control switches and relays of the system, except for the timing switch 13 which is set on the forward face of casing 12 in about the relative position shown in Figs. 1 and 3. Upper casing 12 is preferably made up of a base 14 which is mounted directly on the upper face of gear casing 11, and secured thereto by any suitable means, and a removable cover 15, comprising top and side walls which may be lifted off the other parts of the casing to expose the electrical control elements and wiring which are contained in the case. For clarity of illustration Figs. 1 and 2 do not show the physical aspects of the wiring, as that will be best understood from the circuit diagrams, it being understood that the wiring and other connections composing the circuits are contained within casing 12.

The feed drive motor 20 is shown as mounted on a bracket 21 depending from case bottom 14, and a supporting bracket 22, for supporting the device in a manner to be hereinafter explained, is mounted on the under face of casing bottom 14. A subsidiary casing or cover 23 encloses the chain drive connection 62 which connects the main feed shaft 10 with the switch shaft 24 mounted in casing 12.

Figures 2, 3, 4, 6:
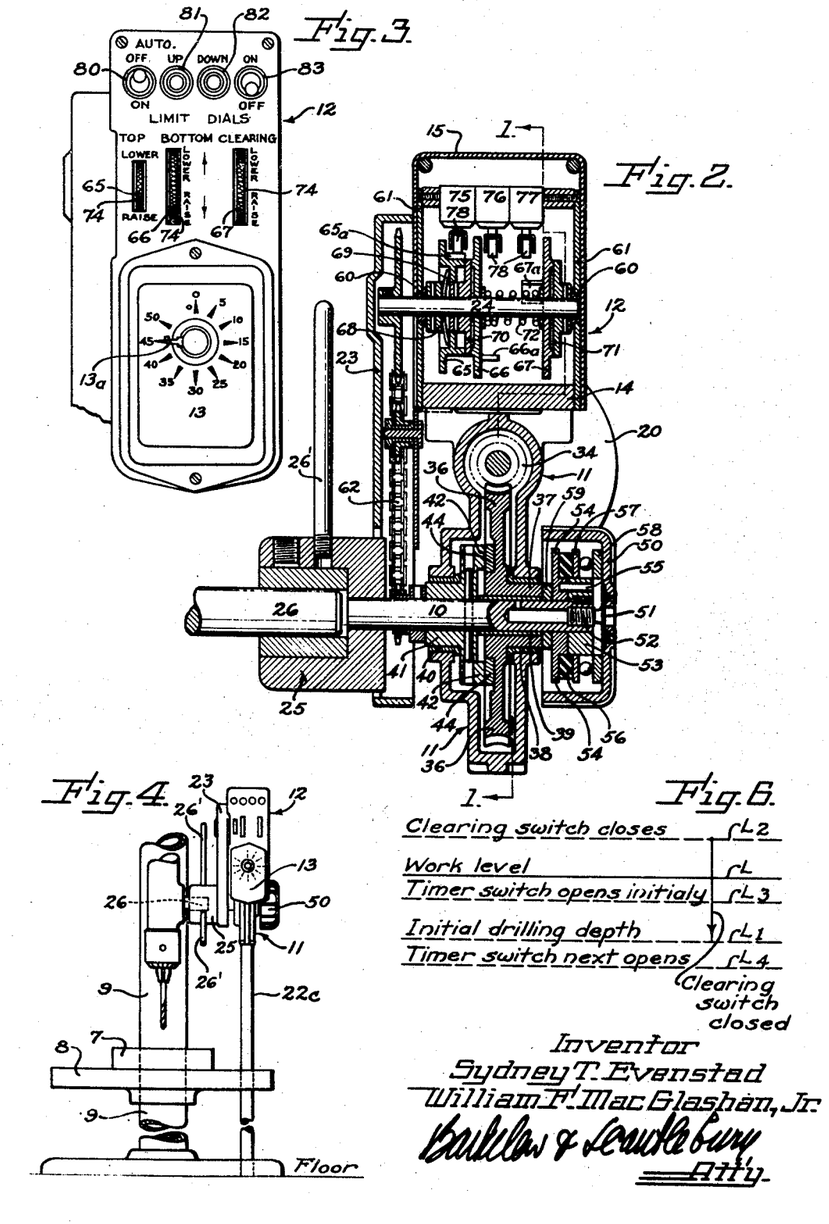
Fig. 2 is a vertical transverse section taken as indicated by line 2—2 on Fig. 1, with certain parts in elevation.
Fig. 3 is a front elevation of the upper parts of the device shown in Figs. 1 and 2.
Fig. 4 is a diagrammatic front elevation showing the device of the other figures applied to a drill press.
Fig. 6 is a diagram illustrating a modified sequence of operation.

At one of its outer ends, the left hand end as shown in Fig. 2, feed shaft 10 carries a split-sleeve coupling 25 adapted to be rigidly set on the outer end of the usual feed shaft 26 of a standard drill press, from which the usual manual feeding handle has been removed. A substitute handle or series of handles 26' is provided on the coupling 25, and the feed of the drill press may be manually operated in the usual manner by using handle 26' after the frictional driving clutch for shaft 10 has been released as will be described.

Figures 1, 1A:
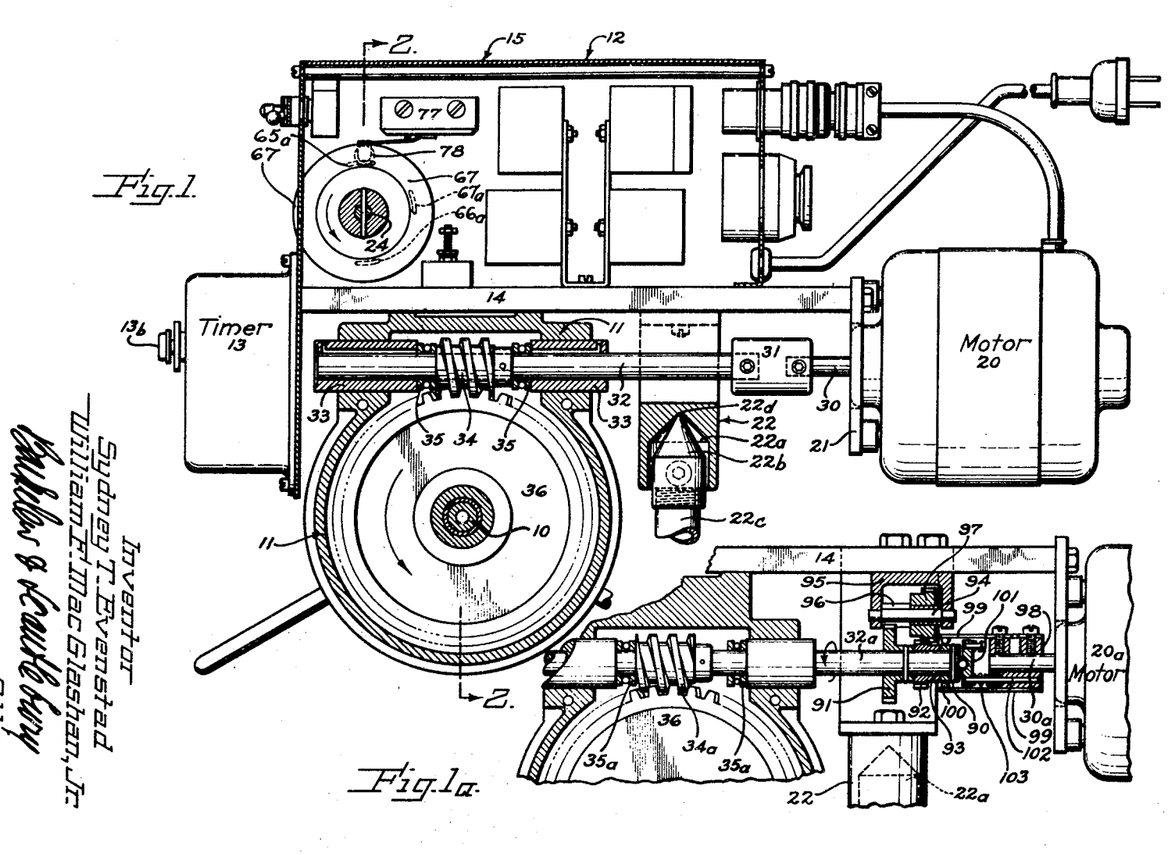
Fig. 1 is a longitudinal vertical section, with certain parts in elevation, showing the physical features of one typical embodiment of the invention, this section being taken as indicated by line 1—1 on Fig. 2.
Fig. 1a is a fragmentary similar section showing a modification.

Motor 20 drives feed shaft 10 through the gearing and frictional devices which are contained in gear case 11 and are shown in Figs. 1 and 2. As shown in Fig. 1, motor shaft 30 is coupled through any suitable coupling 31 with worm shaft 32 mounted in bearings 33 in case 11 and carrying worm 34 rigidly attached to the shaft. End thrust bearings are provided at 35. Worm 34 meshes with worm wheel 36 which has a hub 37 journalled in bearing sleeve 38 in gear case 11. The internal bore of hub 37 has a bearing sleeve 39 which journals one end of shaft 10 concentrically in the worm wheel and free to rotate with reference to it. Feed shaft 10 is also journalled in a bearing bushing 40 which directly journals the hub 41 of a friction disk 42 which is pinned to shaft 10 as illustrated. A ring or disk 44 of suitable friction material lies between friction disk 42 and a side face of worm wheel 36.

A feed index hand wheel 50 is mounted on the head 51 of a screw-threaded stud 52 which is adjustably threaded into the end (the right-hand end in Fig. 2) of feed shaft 10. The hand wheel is hollow and contains the parts about to be described. A collar 53 is rigidly mounted on the end of shaft 10, and immediately inside collar 53 a disk 54 is freely mounted on shaft 10 so as to be slidable with relation thereto. A pin 55 interconnects 53 and 54 so that they rotate together, but allows sliding movement of disk 54. Bearing against disk 54 is a ring 56 of some suitable resilient compressible material, such as rubber or a vulcanized body of rubber and fabric; and an end thrust bearing has one of its race rings 57 bearing against disk 56 and its other race ring 58 bearing against the inside face of hand wheel 50. Disk 59 of friction material is located between the inner or left hand face of disk 54 and the outer or right-hand end of worm wheel hub 37, disk 59 being free to rotatively float, and also free to move longitudinally of shaft 10. The outer face of hand-wheel 50 may be provided with indexing divisions and also provided with an arrow indicating the direction in which the hand wheel should be rotated (right-handed in this case where stud 52 is threaded right-handedly) to increase the frictional torque between worm wheel 36 and feed shaft 10.

From what has been said it will be readily understood how the frictional torque is varied by the setting of hand wheel 50. The hand wheel being directly threadedly mounted on shaft 10, rotational adjustment of the hand wheel in a right-handed direction forces the end thrust bearing 57, 58 inwardly with relation to shaft 10, and disk 54 thus has an increased pressure applied to it tending to force it to the left with relation to the shaft. Disk 42 being rotatively fixed to shaft 10, the result of the foregoing operation will be seen to squeeze the two friction disks 44 and 59 with increased pressure between disks 42 and 54, respectively, and the worm wheel, thus increasing the frictional torque between the worm wheel and shaft 10 proportionately as the pressure is increased. The purpose and function of resilient washer 56 is to allow a greater rotational adjustment of hand wheel 50 for any given change in the frictional pressure, so as to make the adjustment rather gross instead of delicate. And it will be noted that the whole friction clutch, including the two friction disks 44 and 58 to which opposed pressures are applied, is a balanced clutch in the sense that little or no relative longitudinal movement between shaft 10 and worm wheel 36 takes place.

The physical operative characteristics of the device may now be briefly summarized. By backing the feed index wheel 50 clear off, the feed shafts 10 and 26 may be manually operated in the normal manner. The amount by which the wheel 50 is set up determines the maximum torque which will be applied to the feed shaft and therefore the maximum feed pressure which will be applied to the drill. Assuming the R. P. M. of the motor to be 1750, a gear ratio of about 30 to 1 has been found to be satisfactory, although that may be varied to obtain different speed of free feeding operation. With the frictional drive set up to transmit any substantial amount of drilling pressure to a drill, the transmitted torque is sufficient to raise and lower the drill spindle without slippage at the frictional surfaces. Consequently, whenever the drill is being raised either to clearing level or to top, or is being lowered into contact with the work—in short, whenever the drill is not being fed in its actual drilling operation—it is moved at the maximum speed, determined by the motor R. P. M. and the gear ratio. When the drill is cutting into the work, the friction surfaces slip, and the speed at which the drill is then fed into the work (assuming any given drill and work material and rotational speed of the drill) is dependent on the feed pressure which is applied through the slipping friction surfaces.

It will be obvious that the physical mechanism which has been described can be attached to or incorporated in a drill press or other machine tool structure in any suitable manner, it only being necessary that the mechanism be supported in some manner fixedly with relation to the press or other tool or its feed shaft, and that shaft 10 be connected to or constitute the feed shaft. The reversible drive motor represents any suitable reversible power source.

As an attachment readily applicable to a standard type of small drill press, the preferred mounting is very simple. Rigid attachment of the coupling 25 to the feed shaft 26 serves to fix the position of the axis of shaft 10, and to fix the whole mechanism against movement longitudinal of that axis. That attachment leaves only one freedom, that of rotation of the whole mechanism about the shaft axis. That freedom may be restrained in any suitable manner, as by attaching some off-axis part of the mechanism to the drill press. However, the general arrangement of the driving mechanism, and the relation of its center of gravity to the feed-shaft axis, are such that the device needs only be supported at a point to the right of that axis as viewed in Fig. 1, preferably at its center of gravity. Again, that support may be on the drill press itself, or on a bracket attached to the press; but the present preferred support is one which stands on the floor and, merely giving the device a point support, requires no niceties of adjustment.

Thus, supporting bracket 22 has a pointed cup 22a in which a pointed support member 22b is received with considerable freedom. Member 22b is carried on the upper end of a rod or tube 22c whose lower end simply rests on some supporting surface which is fixed with relation to the press—either the press base or the floor, for instance. The point of support 22d is preferably in vertical alinement with the center of gravity of the whole mechanism and may be more or less coincident with it; so that substantially no weight is imposed on feed shaft 26 and its bearings. The direction of rotation of shaft 10 to feed the drill down is counterclockwise (arrow indication) in Fig. 1; and the reaction torque on the casing of the device is clockwise and opposed by the support. When the drill is being raised, the counter clockwise reaction torque is small and the weight of the device, centered at the center of gravity well removed to the right (Fig. 1) from shaft 10, is ample to prevent rotation of the device about the shaft axis.

Fig. 4 shows generally the relation of the device to a drill press whose column is indicated fragmentarily at 9, work table at 8, and a work piece at 7. It is assumed throughout this description that the drill press is driven rotatively by its own motor, independently of the feed device and its motor; and that is of course preferred when considering the device as an attachment. However certain of the broader aspects of the invention do not require a separate motor for actuating the feed; any suitable reversible source of power will suffice.

The modification shown in Fig. 1a is designed to allow the use of a motor of smaller power for a given maximum feed torque. The power required for the free and rapid vertical movement of the drill will, in the mechanism so far described, be substantially less than that required for feeding the drill under pressure, both because of the higher torque on shaft 10 during feeding, and because of the frictional slippage. By using the modification of Fig. 1a the frictional slippage is cut down and a motor of lesser power may be used.

In Fig. 1a the worm shaft 32a, to which worm 34a is rigidly fixed, is free to move longitudinally through a small distance; end thrust bearings 35a at opposite ends of the worm being spaced to allow that movement as shown. Assuming the gear relationships shown in the drawings, shaft 32a rotates in the direction indicated by the arrow (counter clockwise as looked at from the right) to feed the drill down—to rotate gear 36 counter clockwise. When the friction surfaces are slipping, the reaction pressure on worm 34a tends to slide it and shaft 32a to the right with a substantial force. When the friction surfaces are not slipping and the drill is being moved up or down freely, the reaction pressure on worm 34a is much smaller.

Shaft 32a carries a fixed collar 90 at its rear end, and, spaced forwardly, a fixed large gear 91. Between 90 and 91 a pinion gear 92 with a rearwardly projecting and rather long hub 93, is confined longitudinally but free to rotate relative to the shaft. A back gear shaft 94 is mounted in a bracket 95 and carries a long pinion 96 meshing with gear 91 and rotatively connected with a gear 97 which meshes with pinion 92. The various gear lengths are such that the gears stay in mesh throughout the sliding motion of the shaft.

Shaft 30a of motor 20a carries a fixed collar 98 at its forward end. Two or more spring arms 99 are mounted on and project forwardly from the collar, carrying at their forward ends pins or buttons 100 which are spring pressed inwardly toward each other so that the buttons grip either collar 90 or pinion hub 93 depending on the position of shaft 32a. No large gripping pressure is required to transmit the required torque at motor speed.

The rear end of shaft 32a bears against a ball set in a disk 101 which slidably mounted on rods 102 on collar 98 and pressed forward by a light spring or springs 103. The springs exert sufficient forward thrust to keep shaft 32a forward at all times except when that shaft is forcibly pushed back during pressure feeding of the drill. Until that occurs, buttons 100 engage collar 90 and the motor drives shaft 32a directly. Thus, during any free vertical movement of the drill, the mechanism is driven at high speed to give maximum spindle speed in raising or lowering. When the drill is being pressure fed, pinion hub 93 is moved back between buttons 100, so that the motor then drives shaft 32a through the speed reducing train of gears 92, 97, 96 and 91. The speed reduction thus effected must be less than the ratio of the rotational speed of gear 36 to feed shaft 10 in the arrangement of Fig. 1 and when the friction surfaces are slipping. That ratio however is quite large, allowing the use of a reduction gear ratio in Fig. 1a large enough to allow motor 20a to be of minimum power. For instance we find a reduction gear ratio of about 4 to 1 effective. The unit automatically shifts to the low gear drive when load is applied by the drill contacting the work; and the power of a small motor is thus efficiently used.

In the description so far it has been assumed that the driving motor 20 is of any suitable reversible type, preferably a constant speed or synchronous motor. With the motor operating at constant speed a slippage takes place at the adjusted friction clutch whenever a predetermined torque is applied to the feed shaft. The mechanism can be broadly described as one in which the final driven shaft (the feed shaft 10 or 26) is driven from a relatively high speed driver (the motor or the gear 36 driven by it) with an adjustably limited torque. In the mechanism as described that torque is limited by frictional slippage.

The same general functional result can be obtained by using a variable-speed constant-torque motor; a motor whose limiting torque depends on the current supplied to it (which may be controlled by rheostat or other means) and whose speed at any given energization depends inversely on the torque. Such a motor will, without interposed frictional slippage, operate to rotate the feed shaft at relatively high speed when the drill is unloaded and to apply a constant limited torque at relatively low speed when the drill is being fed into the work. Such a motor, with rheostatic torque control, may be substituted for a constant speed motor and the adjustable frictional clutch might then be eliminated. The slippage by which the speed of the tool drive is reduced when load is imposed is in this case an electro-magnetic slippage in the motor. However, to protect small and delicate tools from the impact caused by motor inertia when the tool strikes the work, a frictional slippage or other adjustable yielding element would still be desirable.

The operations of the physical mechanism as so far described can be controlled manually, and are so controllable in the electrical controlling system which will be described. For manual control alone, only a simple provision of power supply and reversing switches for the motor are required; but we prefer to incorporate those manual controls in a fully automatic control system.

Going back now to Figs. 1, 2 and 3; switch shaft 24, mounted transversely of casing 12 in bearings 60 carried in framing 61, is driven from feed shaft 10 through a chain drive 62, the ratio of which is such that for the maximum rotation of feed shaft 10 (the maximum stroke of the drill spindle) the switch shaft 24 will rotate through substantially less than one revolution. The switch shaft carries three switch actuating disks 65, 66 and 67, referring to them in order from left to right as shown in Figs. 2 and 3. At the left hand side of disk 65 a collar 68 is pinned to shaft 24, and a spring washer 69 lies between collar 68 and disk 65. To the right of disk 65 there is a friction disk 70 which is pinned to shaft 24 and against which friction disk the disk 65 is pressed by spring washer 69. The second switch actuating disk 66 lies against the right-hand face of friction disk 70, and the third switch actuating disk 67 rests against the left-hand face of a friction disk 71 which is also pinned to shaft 24. A light spring 72 presses both the disks 66 and 67 against their respective friction disks. The whole structure is simply one on which the three switch actuating disks 65, 66 and 67 are rotatively connected with shaft 24 by light frictional drives which exert sufficient torque to actuate the switches associated with the disks, but allowing ready manual adjustment of the positions of the three disks on shaft 24. To facilitate manual adjustment the forward edges of the three disks are made to project through slots 74 in the front of case 12, as is indicated in Figs. 1 and 3, and the case carries appropriate legends designating the control functions of the three disks.

The three switch operating disks are provided respectively with switch actuating lugs or cams 65a, 66a and 67a, to actuate, respectively, three switches 75, 76 and 77; each switch being closed whenever the respective cam lug comes to a position under the respective switch actuating roller 78, and opening whenever the respective cam lug moves away from under the roller.

"Top" switch 75 controls and sets the elevational location of the top of the drill spindle stroke. Assuming that the drawings show the mechanism in its position at the selected top of the spindle stroke, cam lug 65a is shown under the corresponding switch roller 78, lifting it to close the top switch 75. Adjustment of disk 65 on shaft 24 thus determines the elevational level of the top of the spindle stroke. Assuming, as is standard practice, that feed shafts 10 and 26 rotate left-handedly in Fig. 1 to lower the spindle, then when the spindle is lowered the switch operating lug 65a moves away from switch roller 78 in a counter-clockwise direction of rotation. Consequently, to lower the level of the top of the spindle stroke, disk 65 is adjusted about shaft 24 in a clockwise direction in Fig. 1—that is, its front exposed edge is moved up. And to raise the adjusted position of the spindle stroke top, the front edge of disk 65 is moved down. As shown in Fig. 3 appropriate labels on the case indicate those adjustment movements for changing the top level of the spindle.

The general function of "bottom" switch 76 is to adjustably control the level of the final bottom to which the drill will be operated, that is, to control and set the bottom end of the tool stroke. The switch actuating lug 66a on disk 66 will therefore have an adjusted position, with relation to its corresponding switch roller 78, rotatively removed from that roller by a rotational angle in a clockwise direction in Fig. 1, the angle corresponding to the vertical distance between the selected top position of the spindle and the selected bottom position. In Fig. 1 the lug 66a is shown in a position removed about 180° clockwise from the switch roller. As the spindle moves down the lug 66a will be rotated counter-clockwise in Fig. 1 until it comes under roller 78 and closes switch 76. To lower the controlled bottom position of the spindle, the disk 66 is adjustably rotated about shaft 24 in a clockwise direction in Fig. 1—that is, its forward edge as shown in Fig. 3 is moved up; conversely its forward edge is moved down to raise the controlled bottom position.

A typical position of cam lug 67a on disk 67 is also shown in Figs. 1 and 2, remembering that these figures show positions of the various parts when the drill spindle is at the top of its stroke. The drill spindle of course approaches its clearing position from below, moving upwardly from a position from which it is being cleared. Assuming that the clearing level is approximately at the top surface of the work, where the drill has first come into contact with the work, then the switch operating lug 67a, set in some such relative position as shown in Fig. 1, will have rotated counter-clockwise in Fig. 1 and have passed under the switch roller 78 of "clearing" switch 77 at about the position where the drill has first contacted the work, and will have then rotated on around to the left away from roller 78 as the drill deepens the hole in the work. Thus, at all times after the drill point is below the surface of the work (or below the selected clearing level) lug 67a will be in a position to the left of its switch roller 78 in Fig. 1 and will move toward the right to again come under roller 78 in each clearing operation. From what has been said it will be seen that to adjustably lower the selected clearing level disk 67 is adjusted in a clockwise direction in Fig. 1 about shaft 24, and reversely adjusted to raise the selected clearing level.

When the device is first installed on a drill press the top switch disk 65 is set on shaft 24 so that top controlling switch 75 will be closed just about or just before the drill press spindle reaches its upper physical limit; or the top position may be initially or subsequently adjusted to any suitable level below the upper physical limit; and after the top level has been once so set it need not be reset unless it is desired to lower the top limit for some particular job.

The bottom and clearing disks are set as follows. When the attachment is being set to operate on a new piece of work, the clutch is released and the drill spindle will be first run down manually to the ultimate depth to which a hole is to be drilled, and then the bottom switch controlling disk 66 will be manually set on shaft 24 in such position that the bottom controlling switch 76 is just closed at that ultimate bottom position of the drill. In that adjustment the operator starts with disk 66 set in such a position as to define a bottom position lower than the one he wishes to adjust to, and then, after having run the drill down to the desired bottom position, he adjusts disk 66 in the "raise" direction until switch 76 is just closed. Closed positions on switches are indicated by index marks on the disks.

After having adjusted the bottom position of the drill spindle, the spindle and drill are then raised to the clearing level, and clearing disk 67 then adjusted, clockwise in Fig. 1—in the "lower" direction of Fig. 3—until the "clearing" control switch 77 is just closed in that position. Having made those various settings the mechanism is then ready to go to work automatically on the given piece of work after the timer switch has been set for the clearance time period.

The function of the timer switch is to adjustably control the length of time, and thus indirectly control the depth, to which the tool will drill in each ensuing operation before being withdrawn for clearing. The timer switch which is preferably used and is shown in the drawings is a commercially obtainable switch which functions in the manner now described. The timer is adjusted to its selected timing position by turning the pointer 13a by knob 13b right-handedly to the dial designation which indicates the time period desired, here in seconds. The timer has two circuits; an actuating circuit and a control switch circuit or circuits. In the particular form in which it is here used, one control switch is closed and the other is opened whenever the timer pointer is set away from zero; and the timer acts to open the one and close the other switch after the lapse of the selected time period subsequent to its initial energization through its actuating circuit. And, upon each subsequent actuation it resets itself so as to repeat its timing control operation. (The timer used at present is commercially known as a Paragon time delay relay of the 800 series, made by the Paragon Electric Co.)

Figure 8:
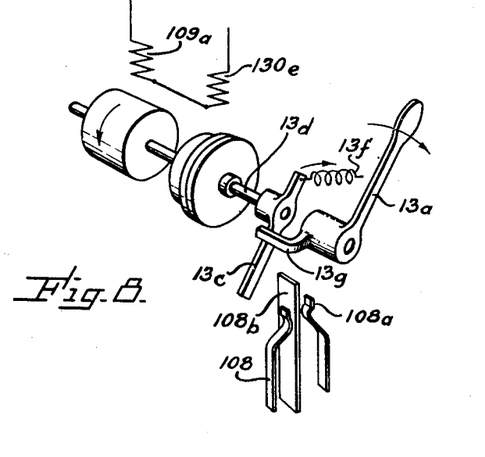
Fig. 8 is a diagrammatic showing of a timer.

Fig. 8 shows, but merely in equivalent diagrammatic form, the functions of such a timer. Switch 108 is the circuit control switch which is normally closed, that is, closed when the timer is set; and switch 108a is open under those conditions. As illustrated diagrammatically a common contact 108b may be considered as spring biased toward 108. An arm 13c is mounted on shaft 13d which is driven counter-clockwise through a magnetic clutch 13e from timer motor 109—a small synchronous motor which in the actual structure drives the timer through a gear train that need not here be shown. The direction of driven rotation is indicated. The switch operating arm 13c and shaft 13d are spring biased at 13f in a rotational direction opposite to that of the motor drive. Indicator 13a is rotationally settable in any selected position and held in that position by a frictional mounting in the case of the instrument; and a stop 13g connected with the arm limits the movement of switch operating arm 13c in its direction of spring bias. Windings 109a of the motor and 130e of the clutch are connected into the motor energizing circuit so that both are energized and de-energized together; the clutch is open when de-energized. When indicator 13a is set in some position such as shown, arm 13c follows stop 13g to such a position as shown, clutch 13e being open. Switch 108 is closed, switch 108a is open. When the motor circuit is energized the clutch closes and the motor drives arm 13c counter-clockwise until it engages contact 108b and throws it over against 108a— thus opening switch 108 and closing switch 108a. The time period involved in that operation depends on how far indicator 13a is set around in a clockwise direction. The motor, if it remains energized, then stalls. When the motor circuit is de-energized, clutch 13e opens and spring 13f moves arm 13c back clockwise against stop 13g, allowing switch 108a to open and switch 108 to close. The timer is thus in its original set position ready for another timing operation as soon as the motor circuit is again energized.

In the present system, the timing switch is initially energized when the mechanism operates to start the drill down (either from the top or from the clearing level). Seeing that the downward feed of the drill to the working surface is always quick, the time required for that initial down feed is ordinarily only a negligible fraction of the time period during which the drill will be fed into the work before it is to be raised for clearing. Then, after the lapse of the selected time period, during practically all of which the drill has been cutting under the selected imposed pressure, the time control switch opens and functions to actuate the system to immediately raise the drill. The timer switch is consequently, in full effect, a drilling-depth measuring device. Assuming a uniform cutting speed, the drilling time determines the drilling depth; and with any given tool, rotary speed and work material, the mechanism maintains uniform cutting speed by maintaining uniform pressure.

In addition to the three automatically operated switches just described, the system has four manual switches 80, 81, 82, 83, referring to them from left to right as shown in Fig. 3. The left hand switch 80, called "automatic" or "auto," is a single-throw snap switch which, when open causes the automatic repetition of the cycle of operations. The switch 81 next to the right is a two-three push button called "up," and the next switch 82 is a single-throw push button, normally closed, and called "down." These two give the operator manual controls to raise the drill to the top, or to lower it or start it down. The switch 83, on the right is a single-throw snap switch which turns the power on and off to the whole system.

Figure 5:
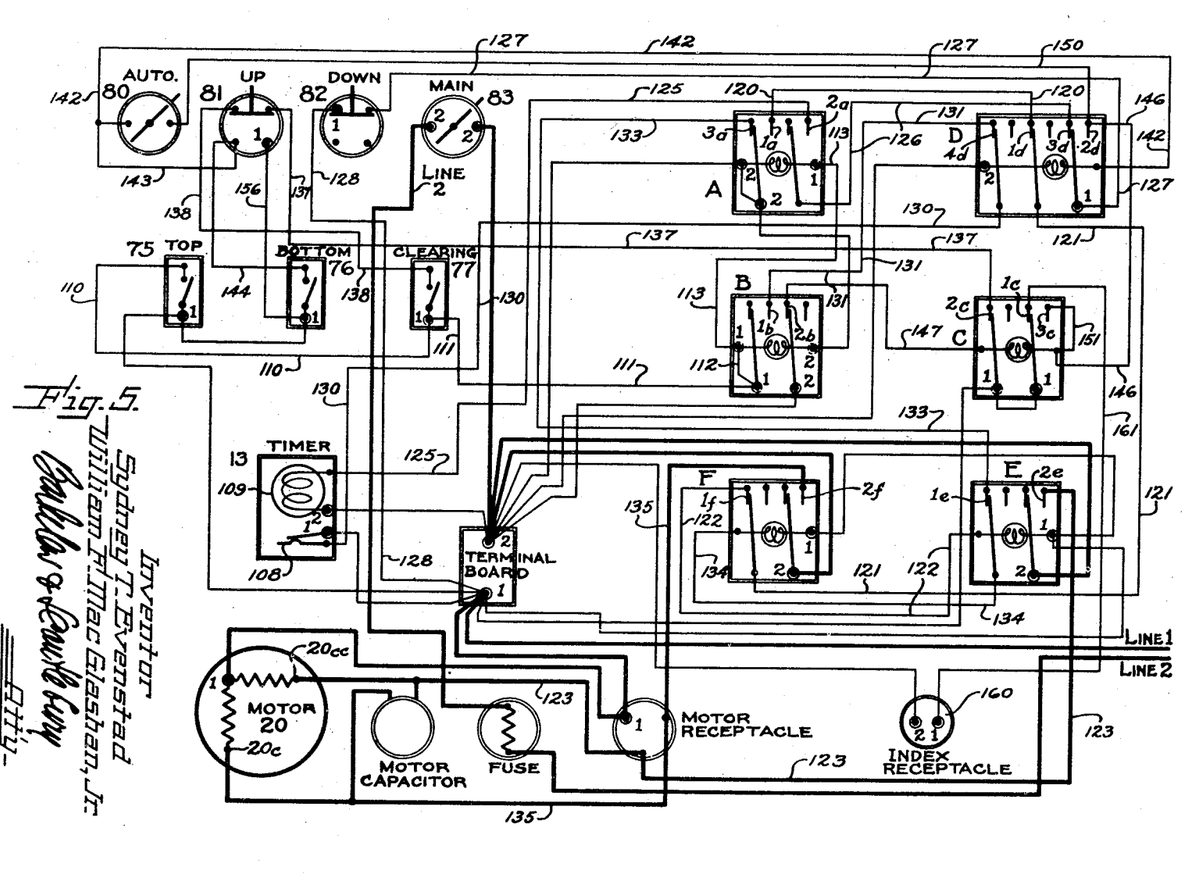
Fig. 5 is a diagram showing one preferred electrical control circuit.

We refer now to the electrical circuiting shown in Fig. 5. When the main switch 83 is snapped closed on line 2, the terminals marked 1 and 2 on the terminal board are energized, as are also all terminals in the diagram which are surrounded by a heavy full line circle and marked 1 or 2. It is assumed at the moment that the drill spindle is at the selected top of its stroke and in that position top switch 75 is closed, energizing certain other terminals, on line side 1. For convenience of description those terminals are marked by heavily dashed circles and marked 1. The top switch 75 being closed, it energizes the coils of relays A and B which are wired in parallel and operate together. Relays A and B are functionally a single multiple-contact relay as they always operate together. The energizing circuit is from the closed top switch 75 through 110, 111, and through relay B to the live terminal marked 2 on that relay, and also through 113 and through relay A to the live terminal marked 2 on that relay. When energized, the contacts of these two relays throw to the right. Relay A, through its contact marked 1a (then on line side 2) and through 120, and contact 1d of relay D, and thence through 121, and then through contact 1f of relay F, and line 122, energizes the actuating coil of relay E, one side of which is connected to line side 1 as indicated. The contacts of relay E move to the right and, through contact 2e (which is then connected to line side 2) and through line 123, energizes the main motor at 20cc to cause the motor to turn counter-clockwise and to feed the spindle and drill down. Relay A, subject only to the control of relay D, thus controls the energization of relay E to energize the main motor to move the drill spindle down. As will appear, relays E and F are cross-connected so that they act as a single relay set; and relay A directly and solely controls the energization of relay F to energize the motor to move the drill spindle up, as will appear. In certain types of operation, as will be explained later, relay D is functionless in the control of the energizing circuits of relays E—F; and under those circumstances relays E—F can be considered simply as a single relay controlled by relay A.

At the same time that the main motor is energized, the timer motor 109 (which has one side permanently connected to line side 2) is energized on line side 1 through line 125, contact 2a of relay A, line 126, contact 3d of relay D, line 127, and the down button which is in its normally closed position and is permanently connected at one of its terminals through line 128 to line side 1. The timer motor thus, under control of relay A, begins to operate the timer in its timing function at the same time that the drill spindle starts down from the top. Generally speaking, the timer motor circuit is energized whenever relay A is energized and therefore whenever the drill spindle is moving down. It is de-energized whenever A is de-energized (to move the drill spindle up) or whenever relay D is energized by the bottom switch being closed, or whenever the down button 82 is opened. The reason for including relay D or its equivalent in this circuit will appear later.

As soon as the spindle leaves its top position the top switch 75 opens, and that leaves the actuating coils of relays A and B energized through a holding circuit which includes the timer switch 108 and one of the contacts of relay D in series; so that A and B will be de-energized by either the opening of the timer switch or by energization of relay D. Relay D is energized, as will appear, by closure of the bottom switch 76. The holding circuit, from line side 1 at the timer switch is through that switch, line 130, contact 4d of relay D, line 131, maintenance contact 1b of relay B, line 112 and the B coil, and line 113 and the A coil, to line side 2. The function of relay D in this circuit is to de-energize A and B when the drill reaches final bottom. The function of maintenance contact 1b of relay B is to keep relays A and B energized after initial energization by either top switch 75 or clearing switch 77, which open when the spindle moves down. The above switches can be considered as momentary contacts. In the particular timer which is here used (although this is not necessary), the timer resets itself and closes its switch 108 on de-energization of its motor—and that occurs immediately whenever relays A and B are de-energized and the drill spindle starts up. Also, in some modes of operation, relay D de-energizes as soon as the drill-spindle starts up, as will be explained. The function of the timer switch is, by opening, to de-energize A and B after the predetermined time period.

After the main motor has fed the drill down for the pre-set time period, the timer switch opens the holding circuit of relays A and B, both of which then move back to normal position— to the left. Relay E is thus de-energized (as its energizing circuit goes through 1a of relay A as well as through D and F), and moves to its normal de-energized position, thus breaking the feed circuit to the main motor terminal 20cc; whereupon, the motor stops feeding the drill down.

With relays A, B and E in their normal de-energized positions, contact 1e of relay E is made live on line side 2 through contact 3a of relay A and line 133; and from contact 1e of relay E, through line 134, the energizing coil of relay F is energized on line side 2, throwing the contacts of relays F to the right. Contact 2f is thus made on line side 2, and that contact feeds the main motor through line 135 to the motor terminal 20c to cause the motor to revolve clockwise and to raise the drill spindle.

It will be noted that the two relays E and F which directly control the main motor circuit are cross-connected so that neither can be energized, to feed the motor, unless the other is de-energized. These two relays can thus be regarded as a single relay set with a neutral position under control of the relay set A—B; acting simply as motor power switch relays to energize the motor for operation in one direction or the other depending on whether relay set A—B is energized or not.

When in its upward travel, the drill reaches the clearing position which has been pre-set by the setting of the clearing switch 77, that switch is closed. As a result of that closure relays A, B are again energized, and relay F consequently de-energized. With A, B and F in those positions, relay E is again energized, and the immediate result is to energize the main motor to move the spindle and drill down again. The timer is also energized, as before to begin its timing operation.

The clearing switch circuit for energizing relays A and B is as follows. At this time relay C is in its normal de-energized position—it is only energized when, among other conditions, relay D is energized when the drill reaches the final pre-set depth and closes the bottom switch 76. The clearing switch circuit, from line side 1, leads through contact 2c of relay C, line 137, the "up" button which in its normal position connects line 137 with line 138, and through line 138 and the clearing switch (now closed) and lines 111, 112 and 113 to the coils of relays A and B, each of which is permanently live on line side 2. In general, it will be noted that the clearing switch circuit is in parallel relation to top switch 75, so that the closure of either of those switches can energ'ze relays A and B. Both the top switch 75 and the clearing switch 77 are, broadly speaking, switches which control the position of an upper end of a drill stroke; top switch 75 being always operative to stop or reverse the upward movement, and clearing switch 77 being normally operative to reverse the upward movement at a level below the top. The controls effected by the two switches are similar; except that the occurrence of certain conditions render the clearing switch inoperative. It need only be further noted at the instant that the clearing switch circuit includes both the "up" switch 81 and relay contact 2c in series, so that the actuation of either of those elements renders the clearing switch inoperative to energize relays A and B. The general function of relay C in the clearing switch circuit is to make the clearing switch ineffective when the drill is moving upwardly after it has reached its ultimate bottom and closed the bottom switch 76. The function of the "up" switch 81 is likewise to disable the clearing circuit when it is desired to bring the drill to the top by manual control.

It may be noted at this point that the closure of the clearing switch during the initial downward movement of the drill from its top position, through the clearing level, has no effect on the functioning of the system at that time, providing that the setting of the clearing level and the setting of the timer switch are such that the timer switch circuit keeps relays A and B energized until the drill has passed downwardly past the clearing level and the clearing switch has opened. Normally that will be the case, the timer switch holding relays A and B energized through the described holding circuit while the drill is passing downwardly to a point below the clearing level. However, some special types of operation will be later described, in which other kinds of switch settings are made, so that the system may function to cause the drill to initially drill to a pre-determined depth before the timing and clearing operations begin to function.

At the same time that the main motor is energized to start the drill down again from the clearing level, the timer motor, which has been de-energized by relay A going to its de-energized position when timer switch 108 is opened, is again energized through relays A and D when relay A has gone to its energized position as the result of closure of the clearing switch. When the timer motor was de-energized, the timer automatically re-set itself and closed its timer switch 108, as has been explained; so that upon re-energization of its motor it begins immediately to re-perform its timing operation beginning with the time at which the drill starts moving down from the clearing level. The main motor 20 then operates in the manner before explained to feed the drill down in drilling operation until the timer switch again automatically opens, when the system is again actuated to raise the drill to the clearing level. That sequence, of drilling for the predetermined time period and then raising to clear, is automatically repeated until the drill finally reaches the ultimate pre-set depth for which bottom switch 76 has been set; and then the system functions to immediately raise the drill through the clearing level to the top of its stroke, as will next be described.

When the drill finally reaches its pre-set ultimate bottom position, bottom switch 76 closes and energizes relay D on side 1 through the bottom switch, lines 144, 143 and 142, to the coil of relay D, one side of which is permanently connected to line side 2. It may be noted here that relay D can only be energized by the closure of the bottom switch or by the manual actuation of up switch 81 which, by connections 144 and 156 is in parallel with the bottom switch and closes the same circuit that the bottom switch closes. When relay D is energized, its contacts throw to the right and that immediately breaks the energizing circuit of relay E at 1d, to deenergize relay E, which cuts off the current feed which is operating the main motor in the down direction. At this time, relays A and B are only being held energized through the holding circuit of the timer switch, and that circuit is broken at relay contact 4d. Relays A and B consequently go to their normal de-energized positions, with the result that relay F is energized to close the power circuit to main motor 20 to immediately raise the drill.

The energizing circuit of relay E is also broken at 1a when A de-energizes. The reason for controlling the energizing circuit of E by both A and D instead of merely by A will appear later in the discussion of the effect of the automatic switch 80.

Also when relay D goes to its energized position, relay C is energized through contact 2d of relay D. The energizing circuit, from side 1 at the down button 82, leads through the normally closed button, line 127, contact 2d, line 146, the coil of relay C, line 147, and through contact 2b of relay B, which is then de-energized, to line side 2. Relay C going to its energized position opens the clearing switch circuit, at its contact 2c which is in series with the up-button 81 (in its normal unactuated position) and with clearing switch 77, thus rendering the clearing switch ineffective as the drill spindle is moved upwardly. And relay C has a holding circuit (from line side 1 at that relay, through contact 3c and line 151 to the C coil) which by-passes relay D; so that the subsequent de-energization of C is dependent only on the energization of B; and B is not now energized by the clearing switch as the spindle moves up. Consequently, with the several relays A, B and C in the positions last stated, the main motor remains energized until the spindle reaches the top position where top switch 75 is again closed. The function of relay C is merely to break the circuit of the clearing switch from the time when the bottom switch closes and initially energizes relay D, until the time when relays A and B are subsequently energized by closure of the top switch 75; regardless of whether relay D remains energized during that period. As will appear later, relay D remains energized, through its holding circuit, if the automatic switch is closed; and, because the energizing circuit for E is controlled by 1d as well as by 1a, it is then necessary to break the holding circuit of D (later described) by manual operation of the down button in order to start the drill spindle down again. In that type of operation relays C and D may be regarded as one; relay C as a separate element is only necessary in full automatic operation when relay D does not remain energized.

Also when relay D goes to its energized position, it breaks the circuit of the timer motor at contact 3d. That circuit is also broken at contact 2a when relay A goes to its de-energized position. When the timer motor is de-energized, it resets itself and again closes the timer switch 108 as before explained, so that it is again ready for the next series of operations when a drill is again started down from its top position. In this connection it will be noted that the closure of the timer switch 108 by the automatic action of the timer whenever its motor is de-energized, will not re-energize relays A and B to start the drill down again immediately, because timer switch 108, as previously explained, is in a holding circuit for relays A and B, which holding circuit includes not only contact 4d of relay D, but also contact 1b of relay B. Initial energization of relays A and B cannot under any circumstances be caused by closure of timer switch 108.

When relay D is initially energized by temporary closure of bottom switch 76, that relay is then held in its energized position by a holding circuit as follows: From line side 1, through the normally closed down switch 82, through 127, contact 2d, line 150, the automatic switch 80 (if closed) and line 142 to the D coil which is permanently connected at one side to line side 2. The holding of relay D thus depends on both the automatic switch 80 and the down switch 82 being closed. Thus, if relay D is only temporarily energized (with automatic switch 80 open) it immediately goes back to de-energized position when bottom switch 76 opens as the drill spindle moves up. However, relays A and B are not resultantly energized by closure of the timer switch as the spindle moves up, for reasons that have been given; and neither are they energized by closure of the clearing switch on the way up, because relay C has a holding circuit which keeps that relay in its position breaking the clearing switch circuit until relay C is finally released by relay B being again energized. Thus, once relay D has been energized by closure of bottom switch 76, relays A and B will not be re-energized to start the drill down again until the drill spindle reaches the top and closes top switch 75. The holding circuit for relay C, from line side 1 at that relay, is through contact 3c, line 151, the C coil, 147, contact 2b, to line side 2.

From what has been so far described certain generalizations are now noted. The timer switch 108, the bottom switch 76, and the normally open contacts of up switch 81, may all be regarded broadly as lower-position-controlling switches; switches controlling the position of a bottom of a drill stroke, at which the downward movement is stopped and the movement reversed. Their functions are in many respects similar. The timer switch controls the bottom position at the end of a timed period which begins at the time when the drill has just previously started down. It acts by opening the holding circuit of the motor controlling relay set A—B. The relay D is also in that holding circuit. Both the bottom switch 76 and the up switch 81 act to break the holding circuit of A—B by energizing D. The controlling system may thus be viewed as one in which the actuation of either of two upper position controlling switches (the top switch 75 or the clearing switch 77) control the driving motor circuit (through A—B and E—F) to cause motor rotation to move the drill down; while the actuation of any of the three lower position controlling switches (timer switch 108, bottom switch 76, or up switch 81) control the driving motor circuit through the same relays to cause motor rotation to move the drill up. The timer switch controls that function alone, allowing the lower one of the upper control switches (the clearing switch, as normally set) to start the drill down again. The other two lower position switches perform that same function, but additionally, by the action of relay D, render one of the upper position switches (clearing switch 77) functionless until the other upper position switch (top switch 75) has acted at its selected upper position to actuate the motor controls to stop the upward movement and (under certain other controls) to start downward movement again.

When the spindle reaches the top position, closing top switch 75, the closure of that switch directly energizes both relays A and B through the circuit before explained. The action of relay A de-energizes relay F and the main motor 20 stops. Whether or not the main motor is immediately reversed to start the drill down again depends upon the position of automatic switch 80 and of relay D. In its closed position the automatic switch, in series with the normally closed down switch 82, closes the holding circuit of relay D, as before explained. Consequently, with those two switches closed, relay D will be held in its energized position, and relay E will not be energized to start motor rotation in the direction to move the drill down, although relays A and B are energized, because the energizing circuit for relay E is broken at contact 1d of relay D. Energization of relay E to close the main motor circuit depends upon relay A being energized and relay D being de-energized, as well as upon relay F being de-energized. Consequently, if the automatic switch is closed, the main motor will not start rotation in its direction to move the drill down until the holding circuit of relay D is broken. Under those conditions the next cycle of operations of the mechanism is then initiated by the operator opening the down push button 82 after a new piece of work has been put into place. When relay D is thus de-energized by breaking its holding circuit, relay E is immediately energized through the circuit which includes contact 1d, because relay A is at the time energized and relay F is de-energized.

It may be remarked here that when the device and its controlling system are first applied to a drill press and when the first series of operations is started, relays D and C will not be energized until or unless bottom switch 76 has been closed after the power has been turned on at main switch 83. If the bottom switch has not thus been previously closed, the mechanism will start its first downward feeding operation immediately upon the closure of the main switch; and the preceding description of initial downward operation has assumed that those were the conditions. On every succeeding initiation of a cycle of operations, the holding circuit of relay D has to be broken in some manner (either manually by pushing down button 82 or automatically by the action now to be described) before the mechanism will proceed on its next cycle of operations.

If automatic and immediate repetition of the cycle of operations is desired the automatic switch 80 is snapped open. With that switch open the holding circuit of relay D is broken, and that relay only energizes momentarily with the closure of bottom switch 76. The momentary energization of relay D energizes relay C, as before explained; and that relay C remains energized through its holding circuit as long as relay B is de-energized, as before explained; and relays A and B are not subsequently energized until the drill press spindle reaches its top position and closes top switch 75, as has been stated. Thus, with automatic switch 80 open, when the top position is reached and top switch 75 closed, relay D has already gone to its de-energized position, closing the energizing circuit of E at 1d; and consequently relay F is thrown to its de-energized position and relay E to its energized position immediately upon energization of relays A and B by closure of top switch 75. Energization of relay E immediately energizes the main motor to start the drill spindle down again. Energization of relay B also breaks the holding circuit of relay C, that relay going to its de-energized position and thus restoring the circuit of clearing switch 77.

In full automatic operation the fact that the energizing circuit of relay E goes through contact 1d becomes functionless; the only reason for putting relay D in that circuit is for the non-automatic type of operation as explained before. In that type of operation, with relay D functionless in the energizing circuit of relays E—F, the latter may be considered simply as a single relay set under sole control of relay A.

The reason for including relay D or its equivalent in the timer motor circuit can now be explained.

In non-automatic operation of the system, relay A energizes when the drill spindle reaches the top, but the timer motor should not be energized until the spindle starts down. Its starting down, in that mode of operation, is controlled by de-energization of relay D. Consequently, for that type of operation, the energization of the timer motor is made dependent upon the energization of A (or B) and the de-energization of D. It may be noted that the timer motor circuit could be controlled solely by relay E, whose energization depends on both A and D. For full automatic operation neither the timer motor nor relay E need be dependent on D, but only on A.

It may be remarked, however, that the control operations of D over relay E and the timer motor are convenient even if the system is ordinarily used only for full automatic operation. When operating in that manner the operations can be brought to a stop with the drill spindle in its top position at the conclusion of a sequence by simply throwing the automatic switch to its non-automatic position at any time during the last sequence.

For automatic actuation of work indexing mechanism, relay C is provided with a contact 1c which is closed whenever relay C is de-energized. An index circuit receptacle is shown at 160, permanently connected to line side 2, and connected to line side 1 through line 161 and contact 1c. Any type of mechanism for removing one piece of work and for inserting and indexing a sucessive piece may be utilized in connection with my control system. It is here assumed that the indexing mechanism is actuated by breaking a control circuit which is connected with the index receptacle. That control circuit will be broken when relay C is energized when the drill reaches its bottom position and starts upwardly. And then relay C is subsequently de-energized and recloses the index control circuit when the drill spindle reaches its top position. In such an arrangement, initial actuation of the index mechanism will take place when the drill reaches its ultimate bottom position and bottom switch 76 is closed. Assuming that the index mechanism requires a little time to go into action, the drill will be completely withdrawn from the work before the piece of work is removed by the index mechanism; and that mechanism will then act to insert the next piece of work before the drill reaches the work level on its next downward movement. The index actuating circuit may of course be used whether or not the drill press is being operated fully automatically or the down switch 82 is being used to start each successive cycle of operations. The index control circuit of relay C may of course be either normally closed or normally open. Another arrangement of the system to include index operation is explained later in connection with Fig. 7.

The manual controls have been partially explained and will now be summed up. The use of the down push button 82 for initiating downward motion has been described. The up push button 81 is used to bring the drill back to its top position whenever desired. In its normal position, shown in the diagram, its closed contacts are in series circuit with clearing switch 77, as has been explained, so that if the up button is pushed the clearing switch circuit is broken and the clearing switch becomes functionless. The other contacts of the up button, closed when the button is actuated, close the circuit between lines 144 and 156 which connect those up button contacts in parallel with bottom switch 76. Consequently, actuation of up button 81 duplicates the action which ensues when bottom switch 76 is closed, and the drill is then immediately moved to a top position just as if the latter switch had been closed. In both cases the clearing switch is rendered functionless, so that the drill goes through the clearing switch position and on to the top position.

The description has so far dealt with the complete control system, including the controls of the two upper-position-controlling switches (top switch 75 and clearing switch 77) and of the two lower-position-controlling switches (timer switch 108 and bottom switch 76). Certain desirable functions of the control system may however be performed without using some of the switches and their controls.

For instance, if the clearing and timer switches and their controls be eliminated or disconnected, the system will operate with top and bottom controls as described, but without automatic clearing functions. If the clearing switch control alone is eliminated, the timer switch will still function to control the clearing up movements; the clearing level then will be at the position of the top switch 75, which of course may be set by the operator as low as desired. In fact, by manipulation the top switch 75 may be made to perform all the functions which have been described both to it and the clearing switch.

Whether or not the clearing switch control is used, if the bottom switch function be eliminated, the controlled drill will simply go on performing repeated drilling and clearing operations until stopped by the operator or until he causes the drill to lift to the top by pressing the up button.

The system has been so far described in its operation as if the clearing switch 77 were set to be closed, on upward movement, at a level above that from which the drill is moved up when timer switch 108 first opens. In that type of setting the timer switch will remain closed, to hold relays A and B energized, during and after the time period through which the clearing switch 77 is closed while the drill is being moved downwardly. Thus, that closure of the clearing switch is merely incidental and of no functional effect.

However, the clearing switch may be set at a level considerably below the level previously spoken of; and that is done when it is desired to automatically initially drill to a pre-set depth in the work before the timing and clearing operations begin to function. The diagrammatic showing in Fig. 6 will help in an understanding of this mode of operation. In the diagram the level of the top of the work is indicated at L and the level or depth to which it is desired initially to drill is indicated at L1. The clearing switch is set so that it will close, during the upward movement of the drill, at the level L1. Clearing switch lug 67a is shown as being of a substantial circumferential length in Fig. 1 and, within reasonable limits, its circumferential length may be made as great as desired. In practice, it can be made long enough that, if it is set as just before stated, the switch will initially close at some such level as is indicated L2 in Fig. 6 as the drill is moving down; and thus, on the way down, the clearing switch is closed for the vertical distance between level L2 and level L1 and denoted by the length of the arrow which is labelled "Clearing switch closed." The upper level L2 will ordinarily be at or above the top surface L of the work, but it can be below the top surface of the work by any distance which is safely less than the distance which the tool will drill into the work before the timing switch first opens.

For purposes of explanation it will be assumed that the clearing switch is set so that level L1 is, say, ½" below the work surface; and that the timer has been set to allow the tool to drill to a depth of, say, ¼" on each timed operation. What occurs then is as follows. As the drill is moved down the clearing switch is first closed at some such level as shown at L2. The tool comes into contact with the work and, at the level designated L3, below L2, the timer switch opens. That opening does not, however, de-energize relays A and B and start the tool upwardly, because the clearing switch is still closed and its closure (in parallel with top switch 75 as will be remembered) keeps relays A and B energized and consequently keeps the main motor operating to feed the drill down. That condition continues until the tool reaches the depth indicated by level L1, where clearing switch 77 opens.

At the time that clearing switch 77 opens, timer motor 109 is still energized because relay A is still energized, and relay D has not been energized. The timer motor has operated until it has opened timer switch 108 and has then stalled because it can move no further. With the timer switch thus open, the holding circuit of relays A and B is open, and thus both relays immediately de-energize upon opening of the clearing switch. De-energization of relays A and B actuates relays E and F to reverse the main motor and to move the drill spindle upwardly until the clearing switch is again closed. In the meantime the timer motor has been de-energized when relay A was de-energized and broke the timer motor circuit at contact 2a. Upon motor de-energization, the timer has immediately reset itself and closed the timer switch. Consequently upon the re-energization of relays A and B when the drill spindle moves upwardly to re-close clearing switch 77, relays E and F are actuated to energize the main motor to feed the drill down again, the closed timer switch closes the holding circuit of relays A and B to keep them energized as clearing switch 77 re-opens, and the system then proceeds to feed the drill downwardly under timer control. The result is that the tool then drills to such a level as indicated L4 where the timer switch next opens, resulting in the upward movement of the drill to level L1 which then becomes the clearing level. Successive timed clearing operations are the same as before described, with the clearing level at L1.

In the mode of operation which has just been described, by utilizing a cam 67a of suitable length for the clearing switch, the initial drilling depth may be made to be of any suitable dimension. In operating the system in Fig. 5 in that manner however the timer motor may remain energized and stalled for a considerable period of time after it has initially operated to open the timer switch. The supplemental controls of Fig. 7 introduce an additional relay which prevents that extended energization of the timer motor.

Figure 7:
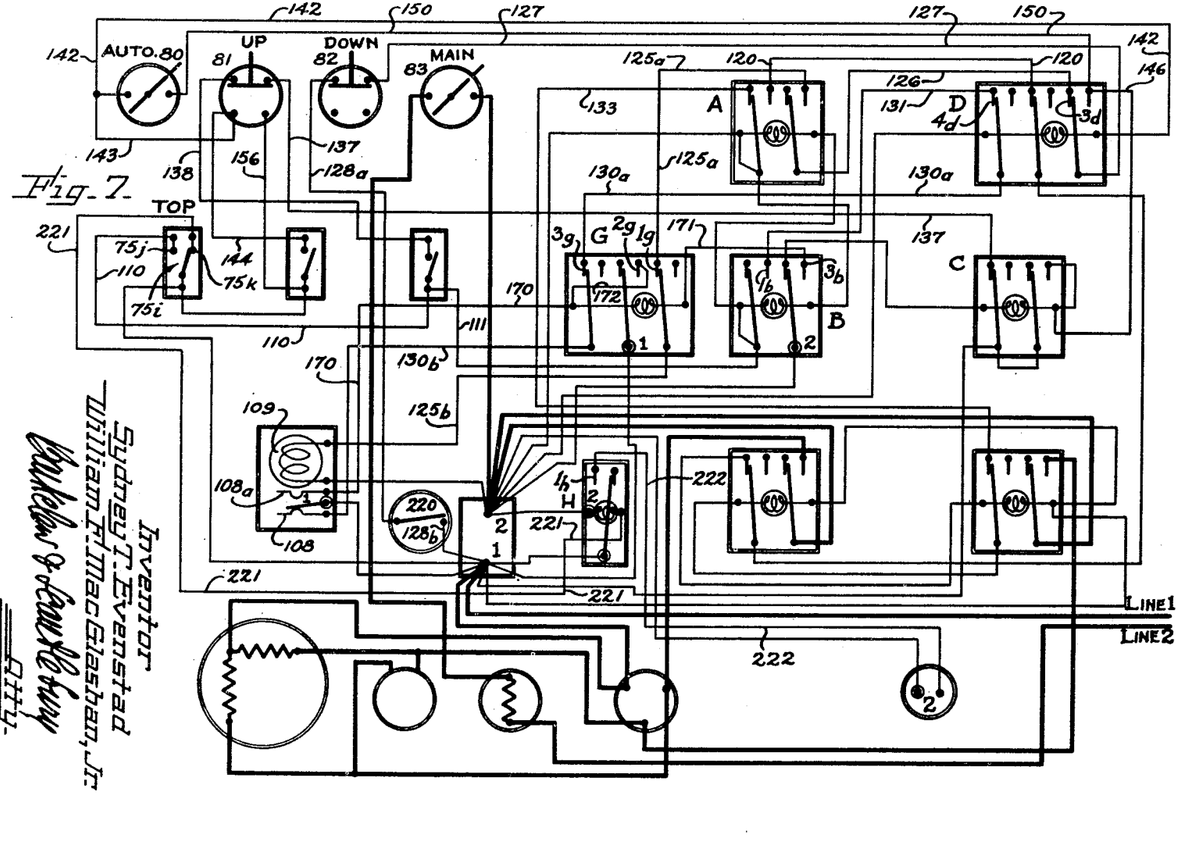
Fig. 7 is a circuit diagram showing modifications and additions to the circuits of Fig. 5.

In Fig. 5 only the normally closed switch 108 of the timer is utilized. In Fig. 7 both the normally closed switch 108 and the normally open switch 108a are utilized. Relay G has an energizing circuit which leads, from line side 1, through timer switch 108a and then through line 170, the coil or relay G, line 171, and contact 3b of relay B (when that relay is energized) to line side 2. Relay G is thus initially energized when relay B is energized (the drill is moving down) and when timer switch 108a is closed (the time period controlled by the timer has elapsed)..

Relay G has a holding circuit which leads from line side 1 through contact 2g and then through line 172 to line 170. The switch contact 2g is thus in parallel with timer switch 108a, and the holding circuit holds relay G energized after 108a opens and as long as relay B is energized.

Relay G controls the feed line 125 of Fig. 5 to timer motor 109, and also controls the timer switch line 130 of Fig. 5. In Fig. 7 the timer motor line 125 of Fig. 5 is shown as line 125a leading from contact 2a of relay A to contact 1g of relay G, and then leading on from relay G as line 125b to the timer motor 109. Thus, the timer motor in Fig. 7 is controlled by relay G, in addition to being controlled by relays A and D as shown in Fig. 5. In Fig. 5 the timer motor is energized whenever relay A is energized and relay D is de-energized; in Fig. 7 the timer motor is energized whenever relay A is in its energized position and both relays D and G are in their deenergized positions.

The line 130 which, in Fig. 5, leads from timer switch 108 to relay D, is shown in Fig. 7 as made up of line 130b leading from switch 108 through contact 3g of relay G and thence leading by line 130a to contact 4d of relay D. That timer switch line in both Figs. 5 and 7 also leads through 131 to contact 1b of relay B. It will be remembered that this circuit in Fig. 5 is the holding circuit for relays A and B, controlled by relay D and also by timer switch 108. Thus, in Fig. 7, this holding circuit for relays A and B is additionally controlled by relay G; that is, the holding circuit for relays A and B in Fig. 7 will be broken whenever relay D is energized or relay G is energized or whenever the timer switch 108 opens.

Going back now to the mode of operation which has been previously described in connection with Fig. 6, it will be assumed that the control switches have been set as described and that the timer has operated to open its switch 108 at level L3 of Fig. 6 and before the drill has reached the depth level L1 at which clearing switch 77 will open. At that time relays A and B are energized and relay D de-energized. The action of the timer at the level L3 is to open switch 108 and to close switch 108a. Closure of switch 108a energizes relay G from line side 1 through switch 108a, line 170, the coil of relay G, line 171 and contact 3b of relay B which is in its energized position. Relay G, going to energized position, breaks the timer motor circuit at its contact 1g. The timer motor circuit being broken, the timer immediately re-sets itself and thus immediately re-opens switch 108a and closes switch 108. Relay G remains energized through its holding contact 2g, unetil relay B breaks the holding circuit by being de-energized.

The drill is then fed on down by actuation of the main motor, and when it reaches the initial drilling depth of level L1, clearing switch 77 opens. When that switch opens relays A and B are de-energized. Although timer switch 108 in Fig. 7 is in the holding circuit of relays A and B, relay G breaks that holding circuit in its energized position.

When relays A and B are thus de-energized, relay B breaks the holding circuit of relay G at the contact 3b, allowing relay G to go to de-energized position, the position shown in Fig. 7, thus closing the timer motor circuit 125a, 125b at contact 1g. In the meantime, due to de-energization of relays A and B, the main motor has been reversed and the drill spindle is raised a short distance until clearing switch 77 is again closed. The closure of that clearing switch re-energizes relays A and B and starts the main motor again in its direction to feed the drill spindle down, and at the same time relay A closes the timer motor circuit at contact 2a. The operation then proceeds below level L1 with the timer again in control of the drilling operations.

The function of relay G may be summed up as that of cutting off the current to the timer motor as soon as the timer has operated to throw its control switch, whenever that occurs while the clearing switch is closed.

Figure 9:
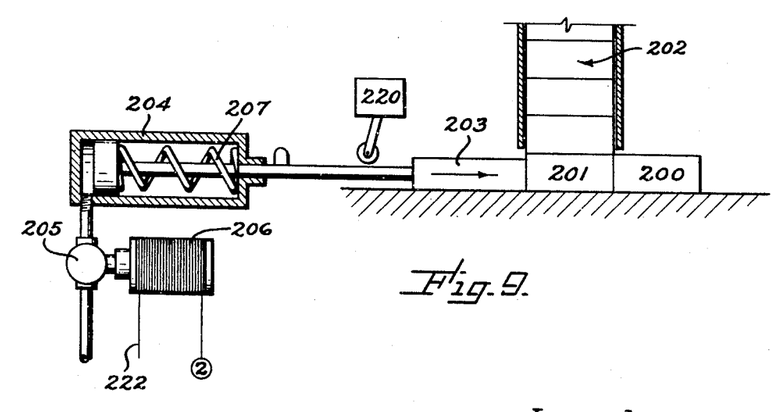
Fig. 9 is a diagrammatic showing of an indexing device.

Fig. 7 also shows another arrangement for incorporating an indexing device in the system in such a manner that the index cannot operate to remove a finished piece of work until the drill spindle has reached the top, and so that the drill cannot again start down until the index has completed its operation and inserted a new work piece. Fig. 9 shows a typical indexing device in diagram, but any suitable form of device may be used.

In Fig. 9 let the numeral 200 represent a piece of work in place to be operated upon. The next piece to be operated on is 201 which stands at the bottom of the pile of pieces 202. A feeder slide 203 is moved to the right by the action of air pressure in cylinder 204, pressure being admitted by opening valve 205 by energizing solenoid 206. When the feeder slide moves to the right it moves piece 200 away (discharges it) and moves piece 201 into place to be operated on. On the back stroke toward the left (caused by spring 207 when the solenoid is de-energized and valve 205 moved to exhaust pressure from cylinder 204) another piece from the pile drops into position 201 ready for the next feeding operation.

To incorporate any such indexing device into my control system, it is provided with a switch 220 which is normally closed and is opened when the feeder slide reaches, or closely approaches the end of its feeding stroke. Any suitable arrangement may be used; I here simply show a lug 208 which engages switch arm 220a at the end of the stroke.

In Fig. 7 the normally closed switch 220 is shown interposed in line 128 which, it will be remembered, is in the holding circuit of relay D. See 128a and 128b in Fig. 7. It will be remembered that, with the automatic switch 80 closed, relay D remains energized and the drill spindle stops at the top until the D holding circuit is broken (manually at down button 82). Thus assuming 80 closed and 82 also closed, and with the normally closed index actuated switch 220 in the holding circuit, the drill spindle cannot start down until that switch 220 is opened by index actuation.

To control the index the top switch, as shown in Fig. 7, is a double throw switch 75i with two contacts 75j and 75k. Contact 75j is the one which corresponds to the single contact shown in Fig. 5; it is the switch which closes to energize relays A and B (to start the motor down if D is de-energized). It is closed when the spindle reaches the top, otherwise being open. Contact 75k is normally closed and opened when the spindle reaches the top. It is connected by line 221 to one side of the energizing coil of an index controlling relay H, the other side of that coil being permanently connected to line side 2. Relay H, thus normally energized, holds an index control circuit open at its contact 1h. When the top switch circuit is opened at 75k, with the spindle at top, H is de-energized and closes the circuit from line side 1 through 1h and line 222 to the actuating solenoid 206 of the index. Thereupon, the drill spindle stops in its top position while the index goes through its feeding stroke. At the completion of that stroke switch 220 is opened to break the holding circuit of relay D and thus to energize relay E to start the main motor to move the spindle down. As soon as that occurs, the energizing circuit of H is closed at 75k, and the relay breaks the index control circuit at 1h. The index then moves through its return stroke, closing switch 220 as it starts back and thus restoring the holding circuit of D for the next successive series of operations.

What has just been described is, in effect, automatic repetition of the whole cycle of operations, under control of an associated mechanism. Generally speaking, the inception of down movement, and of an operation cycle, depends on A and B being energized and D being de-energized. If the automatic switch 80 is open then D, in effect, has no holding circuit and is only momentarily energized when the bottom switch is closed. Energization of A and B at the top then causes the start of another cycle. By utilizing the D holding circuit the inception of a cycle can be placed under any desired control, of which the foregoing (index control) is typical.

There are various other specific operations which may be performed under automatic control. The timer controlled operations may of course be dispensed with by simply setting the timer for a time period longer than will be taken to drill to a pre-set bottom of a hole. The same thing may be accomplished by disconnecting the timer motor circuit. In that arrangement the system will operate to automatically feed the drill down until the bottom switch is closed and then to withdraw the drill to the top position or to the position where the clearing switch is set to close, whichever of those two positions may be the lower.

Automatic timed polishing or lapping operations may also be performed. With the clearing switch set at some distance above the surface of the work, or at the same level as the top switch, the timer may be set for the time period of a surface polishing operation. In that setting of the system, the polishing or lapping tool will first be brought down onto the work surface and will operate on that surface under the selected pressure until the timer acuates the system to cause the lapping tool to be raised. The start of the next timed lapping operation may be either under manual control or may automatically ensue, in the same manner as before described.

The foregoing description of the operation of the tool feeding device in connection with a drill press is merely typical of its operation in connection with other tools. In the following claims the terms "up," "upward," "top" etc. will be understood as relating to a movement or position away from the work, or at or toward one end of the tool stroke; while the terms "bottom," "down" etc. will be understood as relating to movement or position toward or at the other end of the tool stroke.

Although the invention has been illustratively described as being physically in the form of an attachment for existing machine tools, it may be also applied to tools as a "built-in" part of their structure. In the attachment form of the invention, the various controls which are actuated in consonance with tool position are actuated by the tool driving mechanism which is contained within the attachment, in order to include the complete control system within a unitary attachment. However, when the system is built into tools the controls may be actuated by any member which moves in consonance with the tool driven by the driving mechanism; and the statements in the following claims that the controls are actuated by the driving mechanism are to be understood in that sense.

We claim:

1. In a tool feeding system for a machine tool having a reversibly movable tool feeding member, driving means for the tool feeding member including a driven feeding shaft adapted to be connected to the feeding member, a worm gear, a frictional slip element through which the feeding shaft is driven by a limited torque from the worm gear, and a drive means for the worm gear including a worm slidable axially by the reaction force exerted on the worm by the gear, a source of power, and a change of speed transmission mechanism through which the source of power drives the worm and operable by worm sliding to effect different speed ratios of transmission, the arrangement being such that the worm slides longitudinally, to lower the speed at which the worm gear is driven, when the worm is acted on by the reaction force which accompanies the torque at which the friction element slips.

2. In a tool feeding system for a machine tool having a reversibly movable tool feeding member, operating means for the tool feeding member comprising a driven feeding shaft adapted to be connected to the feeding member, a worm gear freely revoluble on said shaft, a friction slip element including friction disks engageable with opposite faces of the gear, both disks revolubly fixed to the shaft and one at least being longitudinally movable thereon, threadedly adjustable means mounted on the shaft and adapted to exert endwise force against the longitudinally movable friction disks to cause the gear to be pressed between the two friction disks with an adjustable pressure, and a drive means for the worm gear including a worm slidable axially by the reaction force exerted on the worm by the gear, a driving element, and a change speed transmission mechanism through which the driving element drives the worm and operable by worm sliding to effect different speed ratios of transmission, the arrangement being such that the worm slides longitudinally, to lower the speed at which the worm gear is driven, when the worm is acted on by the reaction force which accompanies the torque at which the friction element slips.

3. A tool feeding device for machine tools of the drill press type which have a horizontally projecting feed shaft which is rotated in a certain direction to feed a tool into the work, said device comprising a frame, a transverse horizontal feed shaft journalled in the frame and having at one end means for rigid co-axial attachment to the feed shaft of the drill press, said frame extending laterally to one side of the journalled feed shaft and being restricted to rotative movement about the feed shaft when the latter is attached to the drill press feed shaft, a driving motor mounted on the frame in a position laterally removed from the journalled feed shaft, driving connection between the motor and the journalled shaft including a slippage element limiting the torque which can be applied to the feed shaft, the arrangement of the frame and the parts carried thereon being such that their center of mass is laterally removed from the axis of the journalled feed shaft, and means for supporting the frame in a position where said center of mass is horizontally removed from the axis of said shaft, said supporting means engaging the frame at substantially a single point of support in substantially vertical alinement with the center of mass, and the arrangement of said driving connection being such that when the feed shaft is rotated in said certain direction to feed a tool into the work, the reaction torque on the frame tends to rotate the frame about the shaft in a direction against said point support.

4. In a tool feeding system for a machine tool having a reversibly movable tool feeding member, operating means for the tool feeding member including a frictional slip element through which the feeding member is operated, a source of power, a change speed transmission mechanism through which the slip element is driven from the power source, and means associated with the frictional slip element and the transmission and actuated by virtue of the reaction force exerted on the operating means to actuate the change speed transmission to effect different speed ratios of transmission, the arrangement being such that the speed at which the slip element is operated is lowered when the reaction force becomes that at which the friction element slips.

SYDNEY T. EVENSTAD.
WILLIAM F. MacGLASHAN, Jr.

REFERENCES CITED

The following references are of record in the file of this patent:

UNITED STATES PATENTS

| Number | Name | Date |
|---|---|---|
| 373,755 | Rogers | Nov. 22, 1887 |
| 884,529 | Seib et al. | Apr. 14, 1908 |
| 1,303,089 | McCarthy | May 6, 1919 |
| 1,780,083 | Kingsbury | Oct. 28, 1930 |
| 1,989,446 | Ganz | Jan. 29, 1935 |
| 2,030,007 | Kingsbury | Feb. 4, 1936 |
| 2,053,399 | Kingsbury | Sept. 8, 1936 |
| 2,071,539 | Kingsbury | Feb. 23, 1937 |
| 2,102,624 | Hopson | Dec. 21, 1937 |
| 2,271,717 | Schwartz | Feb. 3, 1942 |
| 2,324,727 | Shartle | July 20, 1943 |